Patented Sept. 4, 1934

1,972,395

UNITED STATES PATENT OFFICE 1,972,395

PERMANENT BRILLIANTLY COLORED WRITING FLUID

Galen H. Sayler, Janesville, Wis., assignor to The Parker Pen Company, Janesville, Wis., a corporation of Wisconsin No Drawing. Application February 20, 1931, Serial No. 517,302

3 Claims. (Cl. 134—37)

The object of this invention is to produce a permanent brilliantly colored writing ink suitable for fountain pens.

For many purposes, it is highly desirable that writing ink have a brilliant and pleasing color. This color is usually obtained by the use of synthetic dyes. However, inks made with dyes alone do not have sufficient fastness to light nor permanence to warrant their use on legal documents or other papers, the writing on which is expected to last for considerable time, permanence being defined as the keeping quality of ink after it has been applied to paper. Writing made with such ink will fade on long exposure to sunlight or even after paper containing it has been stored for many years.

Permanence in inks containing dye as the principal coloring constituent is frequently accomplished by the use of the iron tannates which produce a black color in writing after the dye has faded. However, even the black iron tannate will eventually fade by oxidation of the tannins, leaving on the paper brown iron oxide as is often seen in specimens of old writing. Furthermore, the iron salts precipitate and render insoluble many dyes which are highly desirable for use in inks. Also, the iron salts and iron tannate combinations dull the brilliant color of many dyes and render them useless for inks. Other metallic substances are and have been used to produce permanence in inks, among which may be mentioned chrome-logwood colors, Prussian blue, and alizarine-iron lakes. All of these have a deleterious action on the color stability of dyes in inks.

I have discovered that inks applied to paper can be made much more permanent and resistant to light if certain soluble metallic salts are added to the ink which produce colored oxides or decomposition products after exposure to light. For example, if I include in my ink .5 of a percent of ammonium meta vanadate, the permanence is increased very greatly, since, as the dye fades under the action of light, the vanadate decomposes, producing a brown residue which makes the writing legible even when it has been exposed to light so long that the dye has completely faded away. In addition to vanadates, other soluble metallic salts may be used such as vanadyl chloride, ammonium tungstate, potassium ferro- and ferri-cyanides, copper sulphate and nickel sulphate, providing they have no deleterious effect upon the dyestuff or other ingredients used in the ink. The permanence produced by these metallic salts is comparable with that produced in iron tannate inks by iron salts.

In case the writing containing these metallic salts has so completely faded that only a faint color of metal oxide remains on the paper, the writing can be restored to a more legible form in known ways. For example, by chemical treatment with hydrogen sulphide or tannic acid to produce a more deeply colored writing.

The amount of metallic salt to be used may be varied within wide proportions depending upon the degree of fastness required and the composition of the ink. For example, in order to meet the specifications for Government standard writing ink with respect to the minimum content of metallic iron (see circular Bureau of Standards #95, (1925) "Inks, typewriter ribbons and carbon paper", page 6), I may use 22.7 grams of potassium ferro-cyanide per liter of ink which is equivalent to the minimum requirements of 3.0 grams of metallic iron or 15 grams of ferrous sulphate per liter. In the case of ammonium meta vanadate, I find from 3.5 to 7.0 grams per liter produces satisfactory results.

I prefer to use ammonium meta vanadate in my inks since it is easily soluble, is colorless in solution, has little effect upon most dyes in solution, and develops a deep brown color on paper under the fading action of light. Other materials known to the art such as gums, perfumes, introfiers, flow promotors, fungicides and hydroscopic agents may be added to modify the writing properties of the inks, more especially for fountain pen use. In my inks I have found it convenient to use thymol and phenol or salicylates as fungicides, and ethylene glycol is used as a hydroscopic agent to keep the point of the pen moist when exposed to the atmosphere.

I present below typical formulæ which produce excellent inks of the type specified:

Green ink

Naphtaline green, highly conc. (Color Index No. 735, Schultz No. 564.)
Ammonium meta vanadate
Thymol
Phenol
Ethylene glycol
Water Violet ink Pontacyl violet 4BL (Color Index No. 698, Schultz No. 530.)
Ammonium meta vanadate
Sodium salicylate
Thymol
Ethylene glycol
Water

*Red ink*

Eosine Y Ex. conc. (Color Index No. 768, Schultz No. 587.)
Ammonium meta vanadate
Phenol
Thymol
Ethylene glycol
Water Having described my invention, what I desire to claim and secure by Letters Patent is:

1. A writing fluid comprising in solution naphthalene green, highly conc. (Color Index No. 735, Schultz No. 564.), ammonium meta vanadate, thymol, phenol, ethylene glycol and water.

2. A writing fluid comprising in solution pontacyl violet 4BL (Color Index No. 698, Schultz No. 530.), ammonium meta vanadate, sodium salicylate, thymol, ethylene glycol and water.

3. A writing fluid comprising in solution Eosine Y Ex. conc. (Color Index No. 768, Schultz No. 587.), ammonium meta vanadate, phenol thymol, ethylene glycol and water.

G. H. SAYLER.